(12) United States Patent
Tseng et al.

(10) Patent No.: US 10,107,950 B2
(45) Date of Patent: Oct. 23, 2018

(54) FLEXIBLE LIGHT COMBINER BACKLIGHT USED IN A HEAD MOUNTED DISPLAY

(71) Applicant: Oculus VR, LLC, Menlo Park, CA (US)

(72) Inventors: Shie Ping Jeffrey Tseng, Los Altos, CA (US); Evan M. Richards, Santa Clara, CA (US); Jianru Shi, Union City, CA (US); Yue Shi, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 10 days.

(21) Appl. No.: 15/370,664

(22) Filed: Dec. 6, 2016

(65) Prior Publication Data
US 2018/0156960 A1   Jun. 7, 2018

(51) Int. Cl.
*F21V 8/00* (2006.01)
*G02F 1/1335* (2006.01)
*G06F 1/16* (2006.01)
*G02B 27/01* (2006.01)
*G02B 27/10* (2006.01)

(52) U.S. Cl.
CPC ......... *G02B 6/0028* (2013.01); *G02B 6/0068* (2013.01); *G02B 27/0172* (2013.01); *G02F 1/133621* (2013.01); *G06F 1/163* (2013.01); *G02B 6/0073* (2013.01); *G02B 27/1006* (2013.01)

(58) Field of Classification Search
CPC ................. G02F 1/133615; G02F 1/133621
See application file for complete search history.

(56) References Cited

U.S. PATENT DOCUMENTS

| | | | | |
|---|---|---|---|---|
| 2006/0007702 A1* | 1/2006 | Hsieh | ............ | G02B 6/0008 362/611 |
| 2011/0273906 A1* | 11/2011 | Nichol | ............ | G02B 6/0076 362/607 |
| 2014/0300843 A1* | 10/2014 | Hu | ............ | G02F 1/133 349/63 |
| 2018/0038560 A1* | 2/2018 | Neuberger | ............ | F21K 9/64 |

* cited by examiner

*Primary Examiner* — Phu Vu
(74) *Attorney, Agent, or Firm* — Fenwick & West LLP

(57) ABSTRACT

A liquid crystal display (LCD) device including a backlight with an LED assembly. The LED assembly includes a flexible light combiner and two or more different color LEDs optically coupled with a first end of the flexible light combiner. The flexible light combiner includes light channels that transmit color light, and output the color light at a second end of the flexible light combiner. The second end defines a light output region of the flexible light combiner. The light output regions of multiple LED assemblies are arranged behind an LCD panel, along one or more edges, to illuminate the LCD panel. The LED assembly provides edge-lit backlighting with enhanced brightness and color gamut, and flexible LED placement within the LCD device.

23 Claims, 15 Drawing Sheets

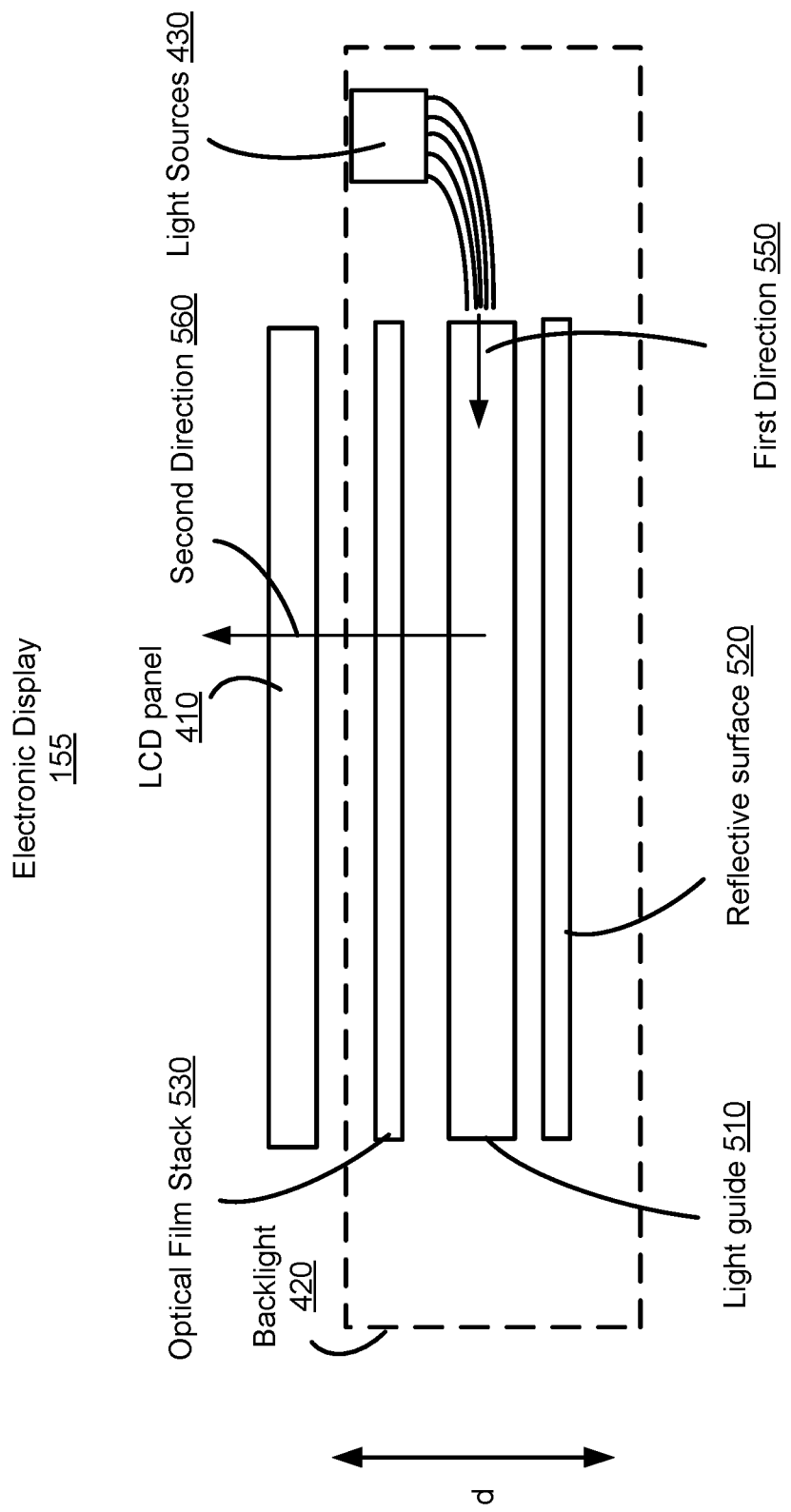

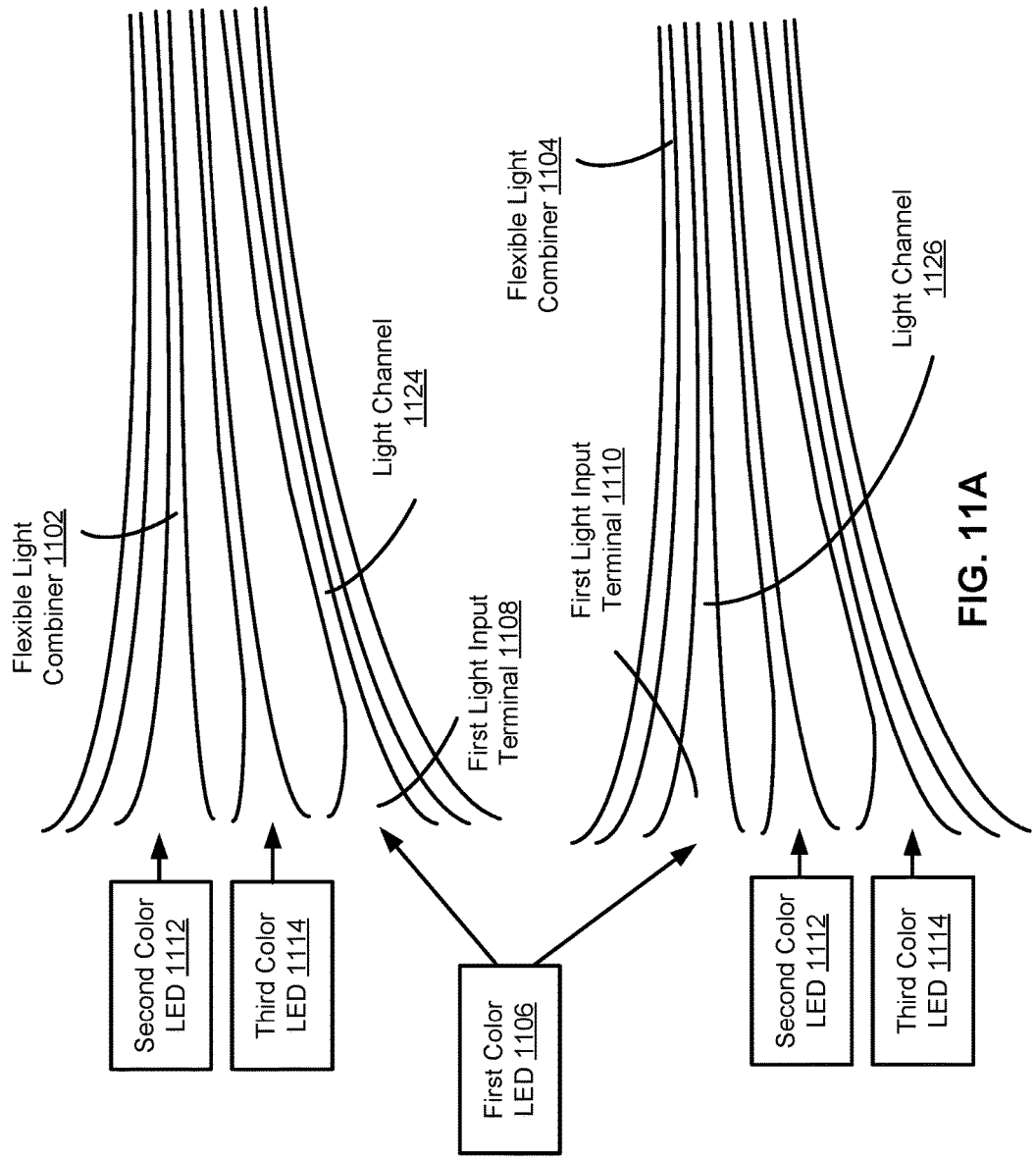

1400

Determine a first emission spectrum of a first color LED of a LED assembly and a second emission spectrum of a second color LED of the LED assembly
1410

Determine a first emission response time of the first color LED and a second emission response time of the second color LED
1420

Control the first emission spectrum of the first color LED relative to the second emission spectrum of the second color LED
1430

Control the first emission response time of the first color LED relative to the second emission response time of the second LED
1440

FLEXIBLE LIGHT COMBINER BACKLIGHT USED IN A HEAD MOUNTED DISPLAY

BACKGROUND

Edge-lit backlights provide illumination for pixels of liquid crystal displays (LCDs) to provide images on the LCD. These backlights may include a single layer of white LEDs arranged along an edge of a light guide. The light guide receives light from the white LEDs and attempts to direct the light evenly to pixels of the LCD panel of the electronic display. The single layer of white LEDs provides light having limited color gamut and brightness, making them less desirable for use as light sources for backlights for head mounted displays (HMDs).

SUMMARY

A liquid crystal display (LCD) device includes a backlight with LED assemblies that serve as light sources of the backlight to illuminate an LCD panel. An LED assembly includes a flexible light combiner, and color LEDs optically coupled with the color LEDs. The flexible light combiner combines light from the color LEDs, propagates the light through a flexible portion of the flexible light combiner, and outputs the light at a light output terminal. The light output terminals of multiple LED assemblies may be arranged in an array along an edge of the LCD panel. A light guide receives the light from the LED assemblies, and directs the light substantially evenly across pixels of the LCD panel. The LED assemblies provide edge-lit illumination sources for the backlight, and allow color LEDs optically coupled with the LED assemblies to be positioned away from the edge of the LCD panel.

For example, an LED assembly includes: a first color LED emitting a first light at a first wavelength; a second color LED emitting a second light at a second wavelength; and a flexible light combiner. The flexible light combiner includes a flexible core including: a first light channel to transmit first light generated by the first color LED, a first end of the first light channel optically coupled with the first color LED; a second light channel to transmit second light generated by the second color LED, a first end of the second light channel optically coupled with the second color LED; and a light output terminal defined by second ends of the first and second light channels to output the first light and the second light in a first direction, the light output terminal disposed behind the LCD panel along an edge of the LCD panel.

The backlight also includes a light guide configured to: combine the first light and second light received from the light output terminal of the flexible light combiner into combined light; and direct the combined light to the pixels of the LCD panel in a second direction to illuminate the LCD panel.

Some embodiments include a head-mounted display (HMD) including an LCD device including a backlight with LED assemblies.

BRIEF DESCRIPTION OF THE DRAWINGS

FIG. 5 shows a cross sectional side view of the electronic display, in accordance with some embodiments.

FIG. 11A shows a LED optically coupled with light channels from two flexible light combiners, in accordance with some embodiments.

FIG. 14 shows a flow chart of a process for controlling an LED assembly of a backlight, in accordance with some embodiments The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Techniques for providing a backlight optimized for head-mounted displays (HMD) are discussed herein. The backlight is disposed behind a liquid crystal display (LCD) device along a thickness dimension to illuminate the pixels of an LCD panel. The backlight includes an LED assembly that serves as a lighting source for the backlight. The LED assembly includes a flexible light combiner and two or more different color LEDs.

The flexible light combiner includes flexible light channels that optically couple with the color LEDs, and transmit color light emitted from the color LEDs through the light channels to a light output terminal of the flexible light combiner. The light output terminal of the flexible light combiner is arranged at edge of the LCD panel to provide an edge-lit light source.

The light output terminals of multiple LED assemblies are arranged behind an LCD panel, along one or more edges, to illuminate the LCD panel. For example, the light output regions of the LED assemblies may be arranged in an array along an edge of a light guide that directs the light to pixels of the LCD panel. The LED assembly provides edge-lighting without requiring direct LED placement along the one or more edges. When used in a head mounted display, the flexible light combiner may be wrapped around an eye cup such that the color LEDs are disposed along a surface of the eye cup. Furthermore, the light channels homogenize the light propagating through the light channels of the flexible light combiner.

In some embodiments, multiple LEDs of the same color may be optically coupled with a flexible light combiner to increase brightness of the backlight. In some embodiments, the color LEDs of the LED assembly include a red color LED, a blue color LED, and a green color LED. A controller controls the different color LEDs, such as by adjusting for emission spectrum and emission response time differences between different color LEDs.

System Overview

Figure 1:
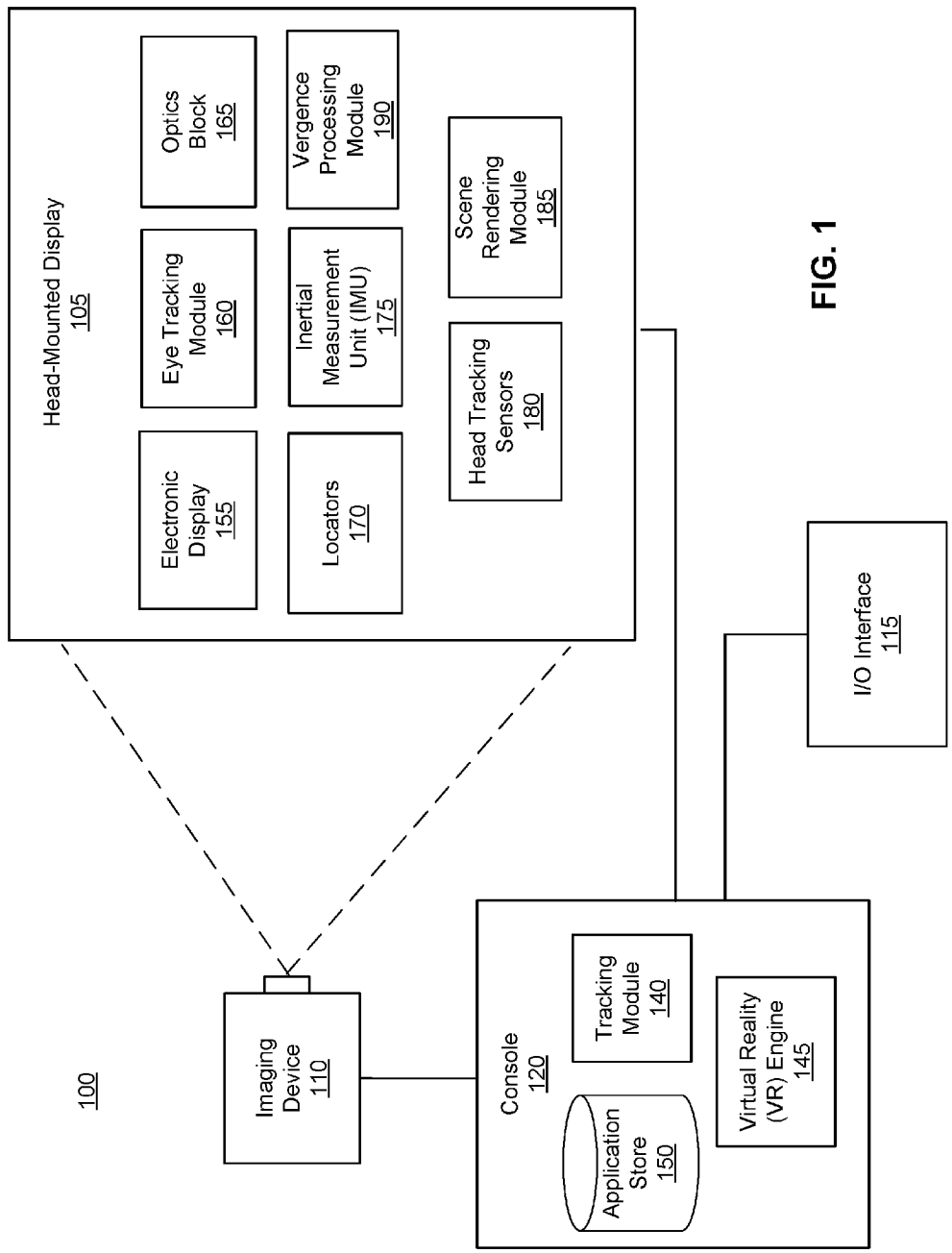
FIG. 1 shows a system, in accordance with some embodiments.

FIG. 1 shows a system 100 including a head-mounted display (HMD). The system 100 may be for use as a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and an I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, and a scene rendering module 185, and a vergence processing module 190.

The electronic display 155 includes an LCD device including a LCD panel and a backlight. The backlight includes LED assemblies with flexible light combiners and color LEDS. The flexible light combiner combines light from different colored LEDs, and provides the combined light to a light guide of the backlight for illuminating the LCD panel. As discussed in greater detail below, the flexible light combiner allows multiple LEDs to provide edge-lighting for the backlight, without requiring the LEDs to be arranged along an edge of the LD panel. The LEDs may be placed in other locations within a display device and/or HMD to improve parameters such as device size, shape, aesthetics, weight distribution, etc.

The optics block 165 adjusts its focal length responsive to instructions from the console 120. In some embodiments, the optics block 165 includes a multi multifocal block to adjust a focal length (adjusts optical power) of the optics block 165

The eye tracking module 160 tracks an eye position and eye movement of a user of the HMD 105. A camera or other optical sensor inside the HMD 105 captures image information of a user's eyes, and the eye tracking module 160 uses the captured information to determine interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/ right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 175 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from a VR engine 145 and provides the content for display on the electronic display 155. Additionally, the scene rendering module 185 can adjust the content based on information from the IMU 175, the vergence processing module 830, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the VR engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the VR engine 145.

The VR engine 145 executes applications within the system 100 and receives position information, acceleration information, velocity information, predicted future positions, or some combination thereof for the HMD 105 from the tracking module 140. Based on the received information, the VR engine 145 determines content to provide to the HMD 105 for presentation to the user, such as a virtual scene, one or more virtual objects to overlay onto a real world scene, etc.

In some embodiments, the VR engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The VR engine 145 generates instructions for the optics block 165, the instructions causing the optics block 165 to adjust its focal distance to a particular location. The VR engine 145 generates the instructions based on focal capability information and, e.g. information from the vergence processing module 190, the IMU 175, and the head tracking sensors 180. The VR engine 145 uses the information from the vergence processing module 190, the IMU 175, and the head tracking sensors 180, or some combination thereof, to select an ideal focal plane to present content to the user. The VR engine 145 then uses the focal capability information to select a focal plane that is closest to the ideal focal plane. The VR engine 145 uses the focal information to determine settings for one or more SHWPs, one or more active liquid crystal lenses, or some combination thereof, within the optics block 176 that are associated with the selected focal plane. The VR engine 145 generates instructions based on the determined settings, and provides the instructions to the optics block 165.

The VR engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
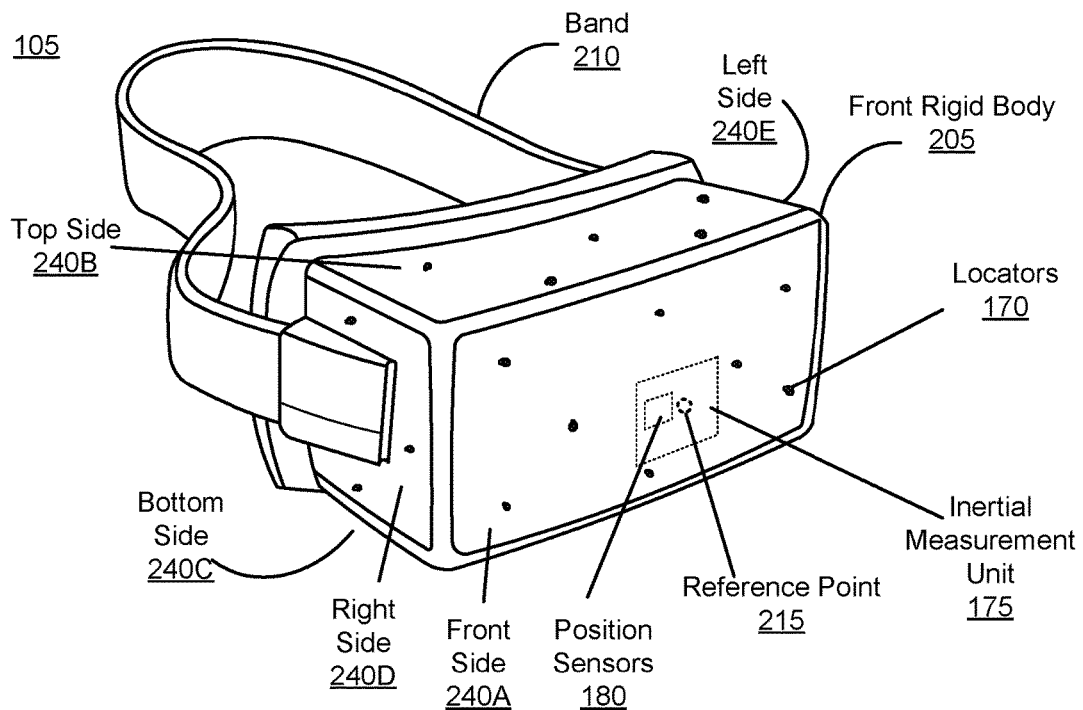
FIG. 2 shows a head-mounted display (HMD), in accordance with some embodiments.

FIG. 2 shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected. In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 100 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 17 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 180 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
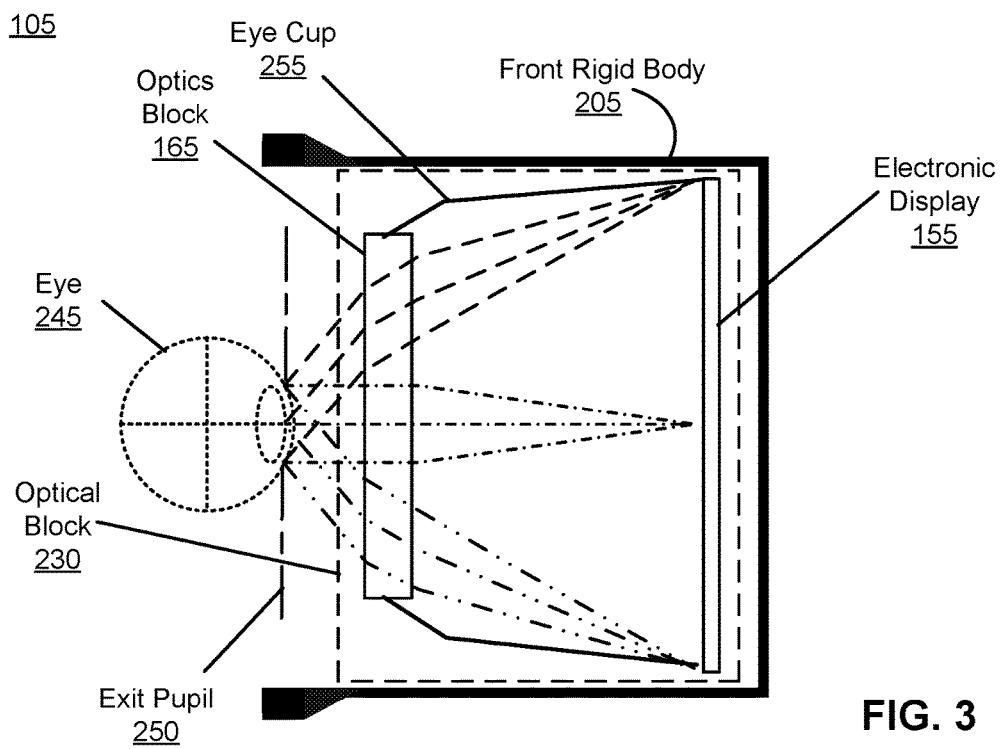
FIG. 3 shows a cross section of a front rigid body of the HMD in FIG. 2, in accordance with some embodiments.

FIG. 3 shows a cross section of the front rigid body 205 of the HMD 105 shown in FIG. 2. The front rigid body 205 includes an optical block 230 that provides altered image light to an exit pupil 250. The exit pupil 250 is the location in the front rigid body 205 where a user's eye 245 is positioned. For purposes of illustration, FIG. 3 shows a cross section associated with a single eye 245, but the HMD 105 may include another optical block that provides altered image light to another eye of the user.

The optical block 230 includes the electronic display 155, the optics block 165, and an eye cup 255. The eye cup 255 is mechanically secured with the front rigid body 205, and holds the optics block 165. The electronic display 155 emits image light toward the optics block 165. The optics block 165 magnifies the image light, and in some embodiments, also corrects for one or more additional optical errors (e.g., distortion, astigmatism, etc.). The optics block 165 directs the image light to the exit pupil 250 for presentation to the user. In some embodiments, the optics block 165 and the eye cone 255 may be omitted from the optical block 230.

Figure 4:
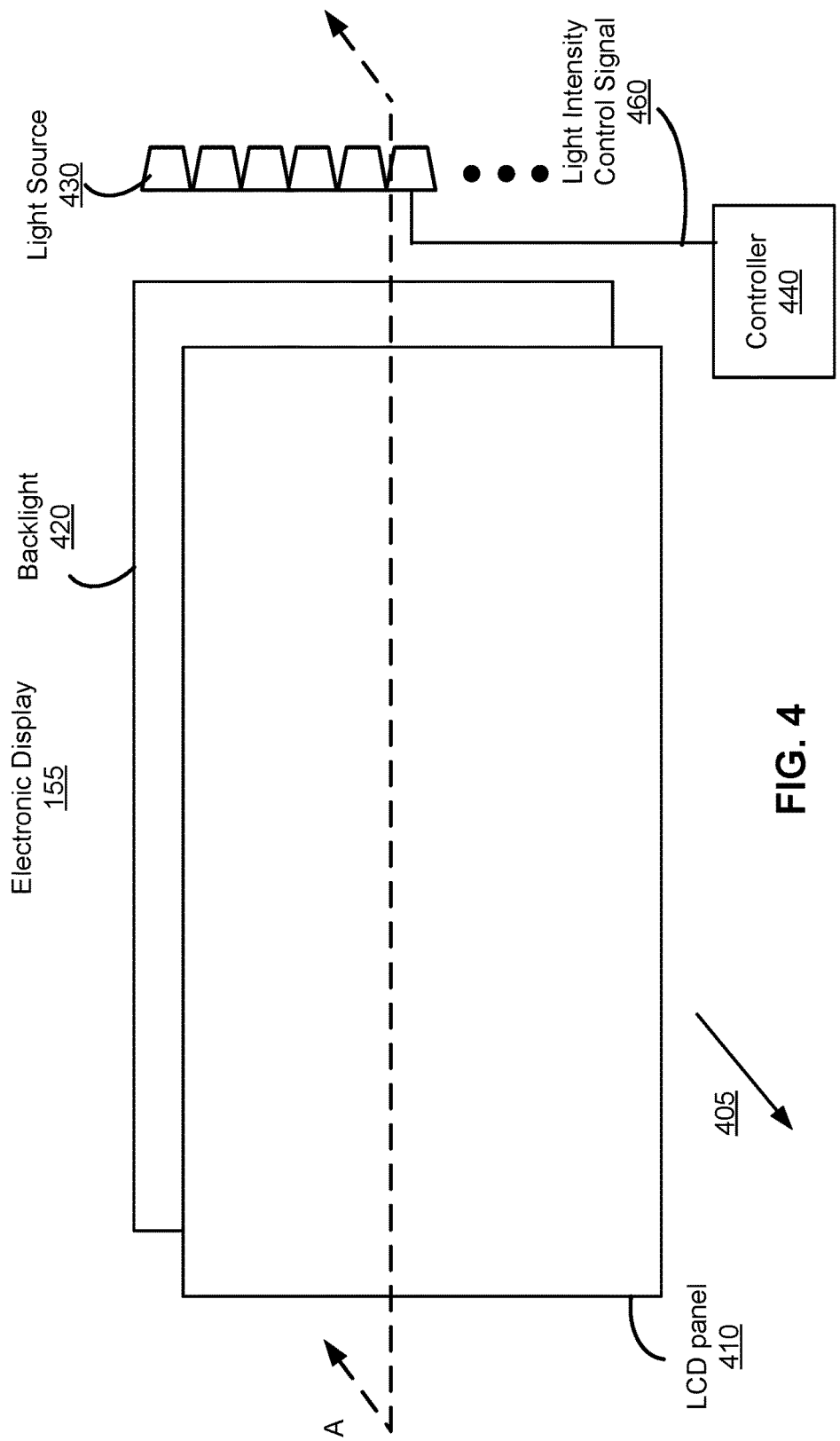
FIG. 4 shows an exploded front view of an electronic display, in accordance with some embodiments.

FIG. 4 shows an exploded front view of an example of an electronic display 155. Although the HMD 105 may include various types of displays, the electronic display 155 in this embodiment is a LCD device including a liquid crystal display (LCD) panel 410, a backlight 420, and a controller 440. The backlight 420 emits light towards the exit pupil 250 through the LCD panel 410 in a direction 405. The LCD panel 410 is disposed between the backlight 420 and the exit pupil 250, and controls an amount of light from the backlight 420 to pass through in the direction 405 on a per pixel basis. A space between the LCD panel 410 and the backlight 420 may be vacuum or filled with transparent material. In other embodiments, the electronic display 155 includes different, or fewer components than shown in FIG. 4.

The backlight 420 includes light sources 430 that generate light. The light sources 430 include LEDs of different color or spectrum intensities (e.g., R, G, and B) that can be separately controlled and optimized to desired spectrum intensities and emission response times. The spectrum intensity of each LED of the light sources 430 may be chosen to collectively produce combined light having wider color gamut and/or brightness than white light from white LEDs.

In some embodiments, the light sources 430 may be packaged as LED assemblies that include flexible light combiners and different color LEDs optically coupled with the flexible light combiners. The flexible light combiner provide a flexible path for light emitted from the color LEDs to an edge of the display to provide edge lighting, while allowing the LEDs to be placed away from the edge of the display.

The intensity (e.g. over time) of light from a light source 430 is adjusted according to a light intensity control signal 460 from the controller 440. In some embodiments, the backlight 420 may be a strobed backlight where LEDs are switched on and off over time (e.g., according to a duty cycle). The light intensity control signal is a signal indicative of intensity of light to be output for each light source 430. Different colored light sources 430 can output corresponding light with different intensity, according to the light intensity control signal. For example, a red light source outputs red light with an intensity corresponding to '10' out of '255', a green light source outputs green light with an intensity corresponding to '30' out of '255', and a blue light source outputs blue light with an intensity corresponding to '180' out of '255,' according to the light intensity control signal. A light source may adjust its duty cycle of or an amount of current supplied to LEDs according to light intensity control signals. For example, reducing current supplied to the LED or reducing 'ON' duration of the duty cycle renders intensity of light from a light source to be reduced (i.e., light to be dimmed).

In some embodiments, the controller 440 is configured to optimize an emission spectrum of the combined light from the light sources 430 based on separately controlling the emission spectrums of differently colored LEDs 430. The emission spectrum of a first color LED may be controlled relative to the emission spectrum of a second color LED. In some embodiments, the controller 440 is configured to optimize input signals to the differently colored LEDS to balance the emission response times of the differently colored LEDs. The emission response of a first color LED may be controlled relative to the emission response time of a second color LED. The optical elements (not shown in FIG. 4 but shown in FIG. 5) of the backlight 420 receive light from the light sources 430, and create combined light having a color corresponding to a combination of colors of the received light.

FIG. 5 shows a cross sectional side view of the electronic display 155, in accordance with some embodiments. The cross sectional side view is taken along line A for the electronic display 155 as shown in FIG. 4. The backlight 420 is disposed behind the LCD panel along a depth dimension d. The backlight 420 includes light sources 430, a light guide 510, a reflective surface 520, and an optical film stack 530. The light guide 510 may be composed of a glass material or a transparent plastic material, and refractive and/or reflective components for receiving light from the light sources 430 in a first direction 550 and projecting light towards the LCD panel 410 in a second direction 560. For example, the light guide 510 may include a structure having a series of unevenly spaced bumps that diffuse propagating light. The density of the bumps increase with distance to the light sources 430 according to a diffusion equation. The light guide 510 receives light with different colors from the light sources 430, and directs combined light including a combination of the different colors in a different direction toward the LCD panel 410 to illuminate the LCD panel 410. The combined light includes improved spectrum intensity across different wavelengths, as described in detail below with respect to FIGS. 6A and 6B.

The light sources 430 include a plurality of LEDs that emit light toward one or more edges of the LCD panel 410 to provide edge-lighting for the backlight 420. In some embodiments, the light sources 430 may be part of an LED assembly including a flexible light combiner that transmits light emitted from the light sources 430 to the edge of the LCD panel 410. The light sources 430 may thus be placed away from the edge of the LCD panel 410.

The optical film stack 530 may be disposed between the light guide 510 and the LCD panel 410. The optical film stack 530 may include a diffuser that facilitates the uniform distribution of light from the light guide 510 across the pixels of the LCD panel 410. The optical film stack 530 may additionally or alternatively include a reflective polarizer film that reflects unpolarized light back toward the LCD panel 410 that would otherwise be absorbed. The optical film stack 530 may also include brightness enhancement films (BEFs) that control the intensity as a function of angle and recycle light through the system.

The light guide 510 directs light towards its top and bottom surfaces, where the top surface faces the LCD panel 410 and the bottom surface faces the reflective surface 520. The reflective surface 520 includes an optical mirror that reflects light directed from the bottom surface of the light guide 510 towards the LCD panel 410.

Returning to FIG. 4, the LCD panel 410 receives a liquid crystal control signal from the controller 440, and passes light from the backlight 420 towards the exit pupil in the direction 405, according to the liquid crystal control signal. The liquid crystal control signal is a signal indicative of an amount of light to be passed through a liquid crystal layer of the LCD panel 410 for different pixels. The LCD panel 410 includes a plurality of liquid crystals, and an orientation of the liquid crystals can be changed according to the light crystal control signal applied across electrodes of the liquid crystal layer.

The controller 440 is a circuitry that receives an input image data, and generates control signals for driving the LCD panel 410 and the LED light sources 430. The input image data may correspond to an image or a frame of a video in a virtual reality and/or augmented reality application. The controller 440 generates the light intensity control signal for controlling intensity of light output by the light sources 430. In addition, the controller 440 generates the liquid crystal control signal to determine an amount of light passing from the backlight 420 towards the exit pupil 250 through the LCD panel 410 according to the input image data. The controller 440 provides the light intensity control signal to the light sources 430, and the liquid crystal control signal to the liquid crystal layer 410 at a proper timing to display a single image.

Figure 6A:
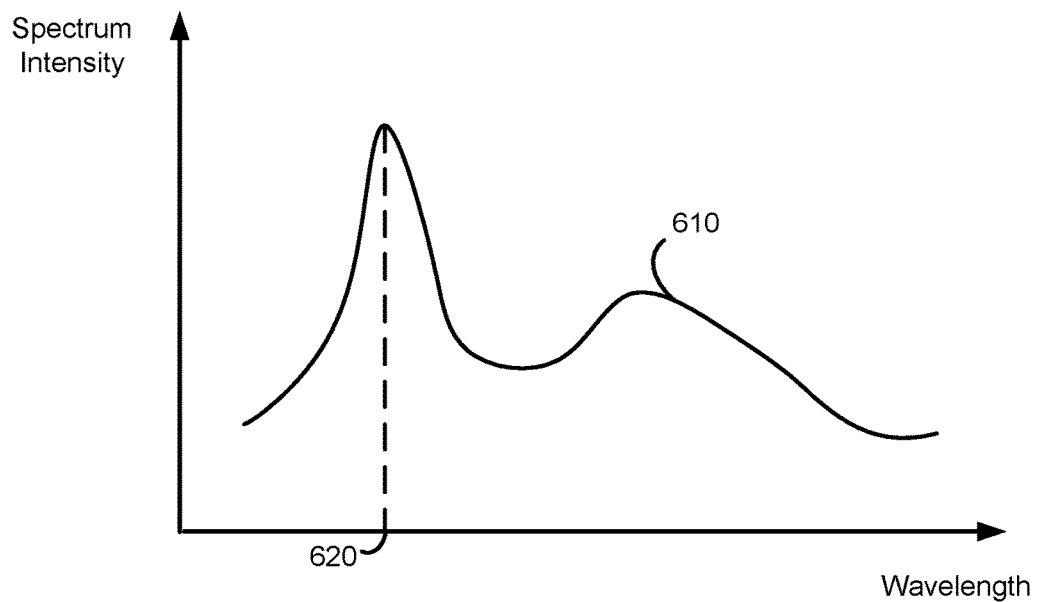
FIG. 6A shows a spectrum intensity of white light generated by a single white LED, in accordance with some embodiments.

FIG. 6A shows an exemplary spectrum intensity of white light generated by a single white LED. A spectrum intensity plot 610 represents spectrum intensity across different wavelengths (or frequency). The white light generated by the white LED single light source has varying light intensity across different wavelengths. For example, the spectrum intensity plot 610 has a peak at a wavelength 620, and has lower spectrum intensity at other wavelengths. A white LED may include a blue LED with a yellow phosphor coating, with the peak 620 corresponding with blue wavelengths. Accordingly, some color components corresponding to the other wavelengths may have reduced intensity than a color component corresponding to the wavelength 620. Put another way, the color gamut of the white LED is sub-optimal, which can result in color distortion when light from the white LED is passed through the LCD panel 410.

Figure 6B:
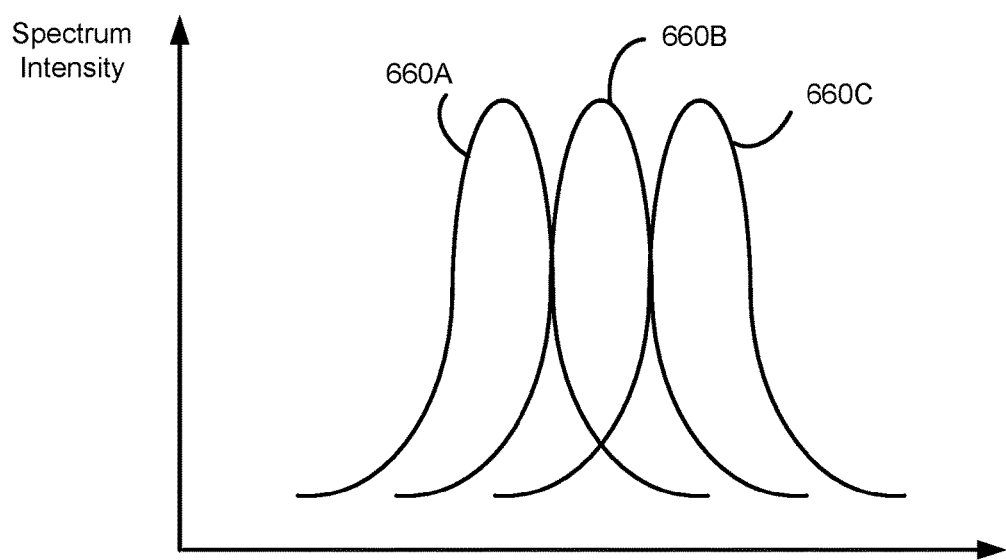
FIG. 6B shows spectrum intensity of white light generated by a combination of separate red, green, and blue LEDs, in accordance with some embodiments.

FIG. 6B shows spectrum intensity of white light generated by separate red, green, and blue LEDs, in accordance with some embodiments. The spectrum plot 660A represents spectrum intensity of blue light output by a blue light source, a spectrum plot 660B represents spectrum intensity of green light output by a green light source, and a spectrum plot 660C represents spectrum intensity of red light output by a red light source. As shown by the spectrum plots 660A, 660B, and 660C, the differently colored light sources emit light with similar intensity at corresponding wavelengths, either by their physical design or via control of input signals (e.g., larger driving current for lower efficiency LEDs to achieve uniform intensity levels, or other desired intensity levels). Light from the different light sources results in a combined light. Thus, improved colors, for example, in red, green, blue, cyan, magenta, yellow and black can be displayed. As a result, the color gamut or color purity displayed on the electronic display device can be improved.

LED Assembly with Flexible Light Combiner for Backlight

Figure 7:
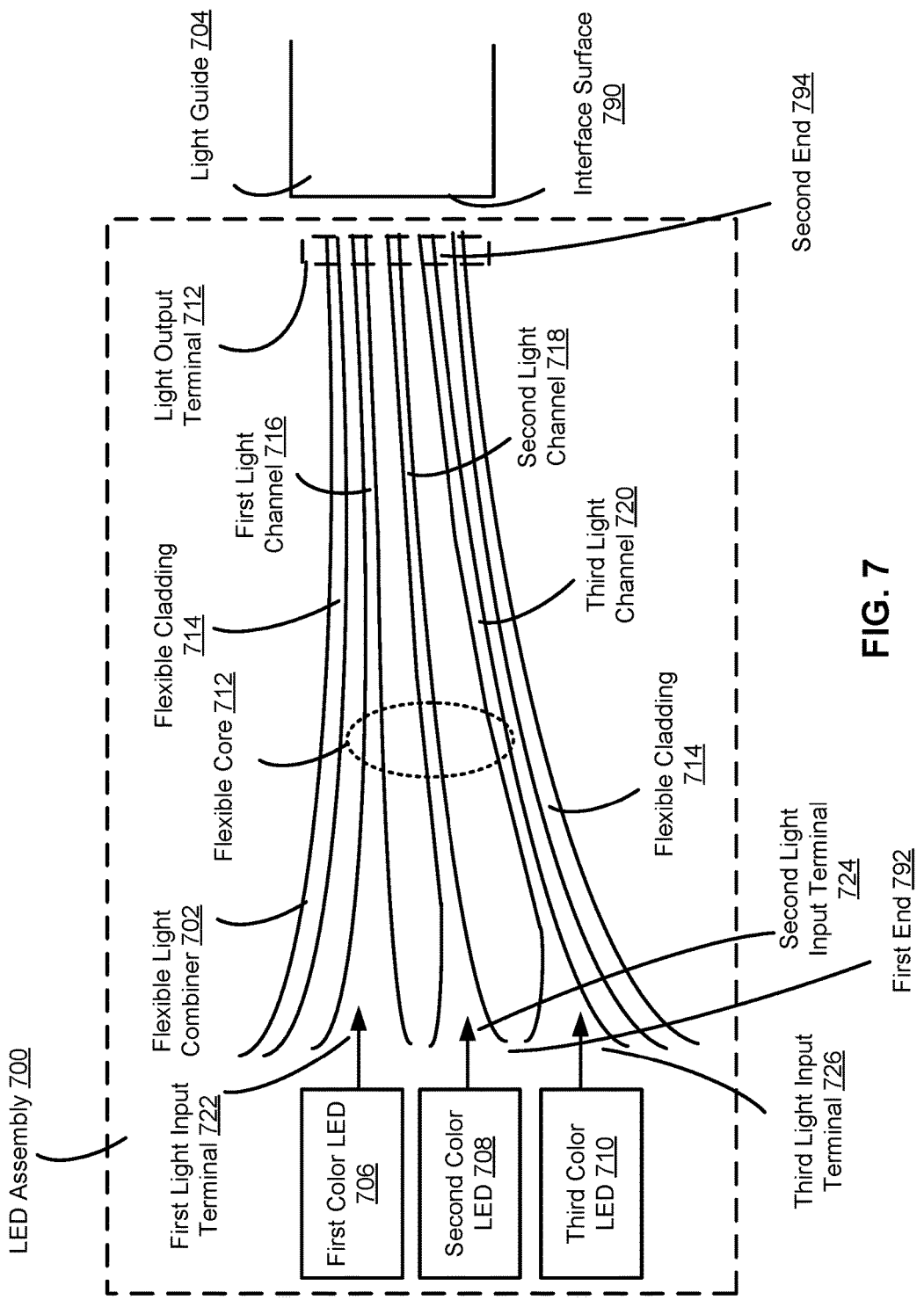
FIG. 7 shows an LED assembly including a flexible light combiner, in accordance with some embodiments.

FIG. 7 shows an LED assembly 700 including a flexible light combiner 702. The LED assembly 700 is an illumination source for a backlight. A flexible light combiner receives light emitted from two or more different color LEDs, propagates the light through flexible light channels, and outputs the light to a light guide 704 at a light output terminal.

For example, the LED assembly 700 is configured to combine light from three different color LEDs, such as a red LED, a green LED, and a blue LED. The LED assembly 700 includes a first color LED 706, a second color LED 708, and a third color LED 710. Each color LED 706, 708, 710 is optically coupled with the flexible light combiner 702 at a first (input) end 792 to emit light into the flexible light combiner 702. The flexible light combiner 702 includes a light output terminal 712 at a second end 724, optically coupled with the light guide 704. Light emitted from the color LEDs 706, 708, 710 is provided to the light guide 704 at the light output terminal 712.

As discussed in greater detail below, a backlight may include multiple LED assemblies 700. The light output terminals 712 of each LED assemblies 700 may be arranged along one or more edges of the light guide 704 to provide edge-lit illumination sources for the backlight.

In FIG. 7, the flexible light combiner 702 is shown in a cross sectional view. The flexible light combiner 702 includes a flexible core 712 and a flexible cladding 714 surrounding the flexible core 712. The flexible 712 core includes a light channel for each color of light transmitted within the flexible core 712. Each light channel 716, 718, 720 includes a first end defining a light input terminal and a second end defining the light output terminal. For example, the flexible core 712 includes a first light channel 716 optically coupled with the first color LED 706 at first light input terminal 722, a second light channel 718 optically coupled with the second color LED 708 at a second light input terminal 724, and a third light channel 720 optically coupled with the third color LED 710 at a third light input terminal 726.

The flexible cladding 714 provides light isolation and mechanical protection for the flexible core 712. The flexible core 712 may include a different material from the flexible cladding 714 such that total internal reflection of light is achieved at the boundary of the flexible core 712 and the flexible cladding 714. For example, the flexible core 712 may include a larger index of refraction than the flexible cladding 714. Light beams propagating within the flexible core 712 to the flexible cladding 714 are reflected back into the flexible core 712.

In some embodiments, each light channel 716, 718, 720 includes a fiber optic cable. Each fiber optic cable may further include a core and cladding, with the core having a larger index of refraction than the cladding to provide total internal reflection for light within the fiber optic cable. In some embodiments, the light channel 716, 718, 720 includes a tapered fiber optic cable. The tapered fiber optic cable is thicker (e.g., larger cross sectional circumference) at the light input terminal and becomes thinner toward the light output terminal. The wider input terminal of a light channel provides for more effective optical coupling with one or more LEDs. The thin output terminal results in a light projection with a smaller surface area on interface surface 790 of the light guide 704. Therefore, multiple LEDs can be optically coupled with the light guide 704 without requiring an increase in the thickness (e.g., size of interface surface 790) of the light guide 704. If the flexible light combiner 702 was not used, then optical coupling with a large number of LEDs (e.g., to achieve enhanced brightness) would be difficult without increasing the thickness of the light guide 704. Furthermore, the light channels 716, 718, 720 of the flexible core 712 carry light emitted from the LEDs to the interface surface 790, thereby allowing the LEDs to be positioned away from the interface surface 790.

The flexible light combiner 702 allows colored light to flexibly propagate within the light channels 716, 718, 720, and also homogenizes the colored light as the light propagates through the light channels 716-720. In some embodiments, the flexible light combiner 702 may be further configured to spatially superimpose the color light from multiple light channels prior to output to the light guide 704, e.g., the first light channel 716, second light channel 718 and third light channel 720 merge to become a single light channel prior to the light output 712. This merged region may also have additional shape to promote mixing and homogenization of the different colors.

Figure 8:
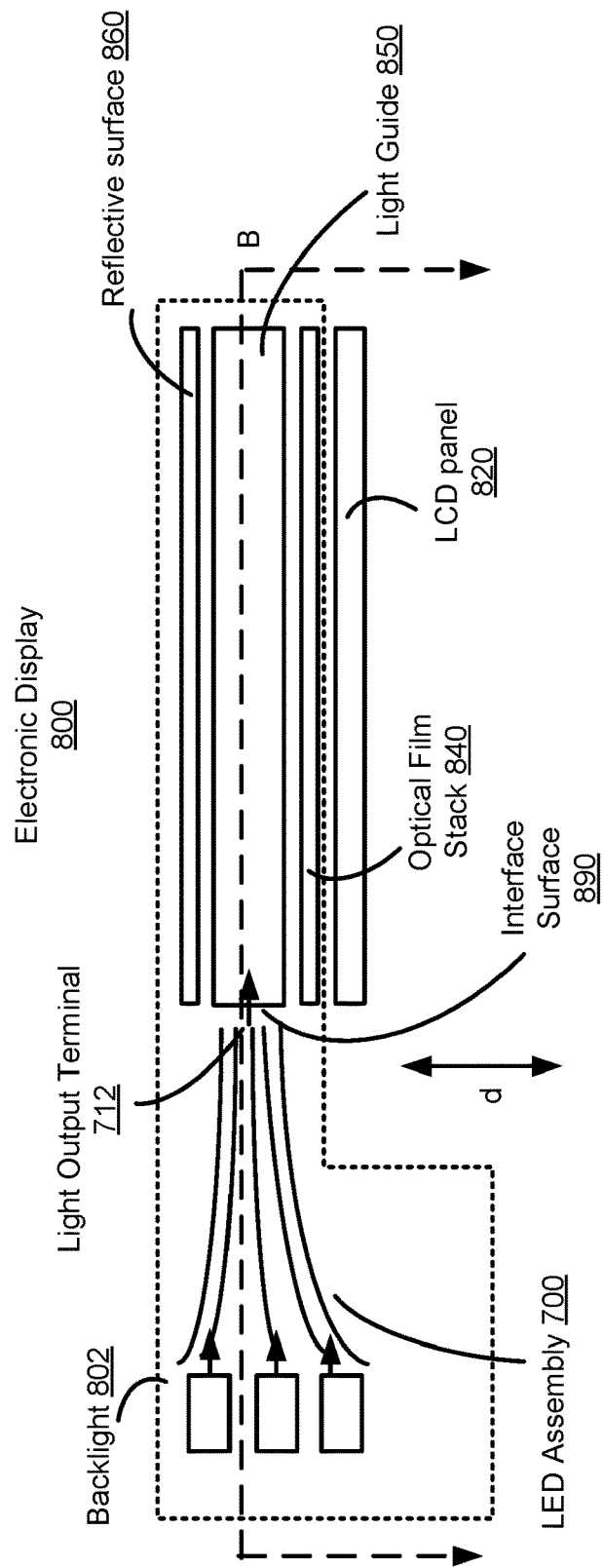
FIG. 8 shows a cross sectional side view of an electronic display, in accordance with some embodiments.

FIG. 8 shows a cross sectional side view of an electronic display 800, in accordance with some embodiments. The electronic display 800 includes a backlight 802 including an array of LED assemblies 700 that serve as light sources for the backlight 802. The backlight 802 further includes a light guide 850, a reflective surface 860, and an optical film stack 840. The electronic display 800 further includes an LCD panel 820. The backlight 802 is disposed behind the LCD 820 along a depth dimension d.

Figure 9:
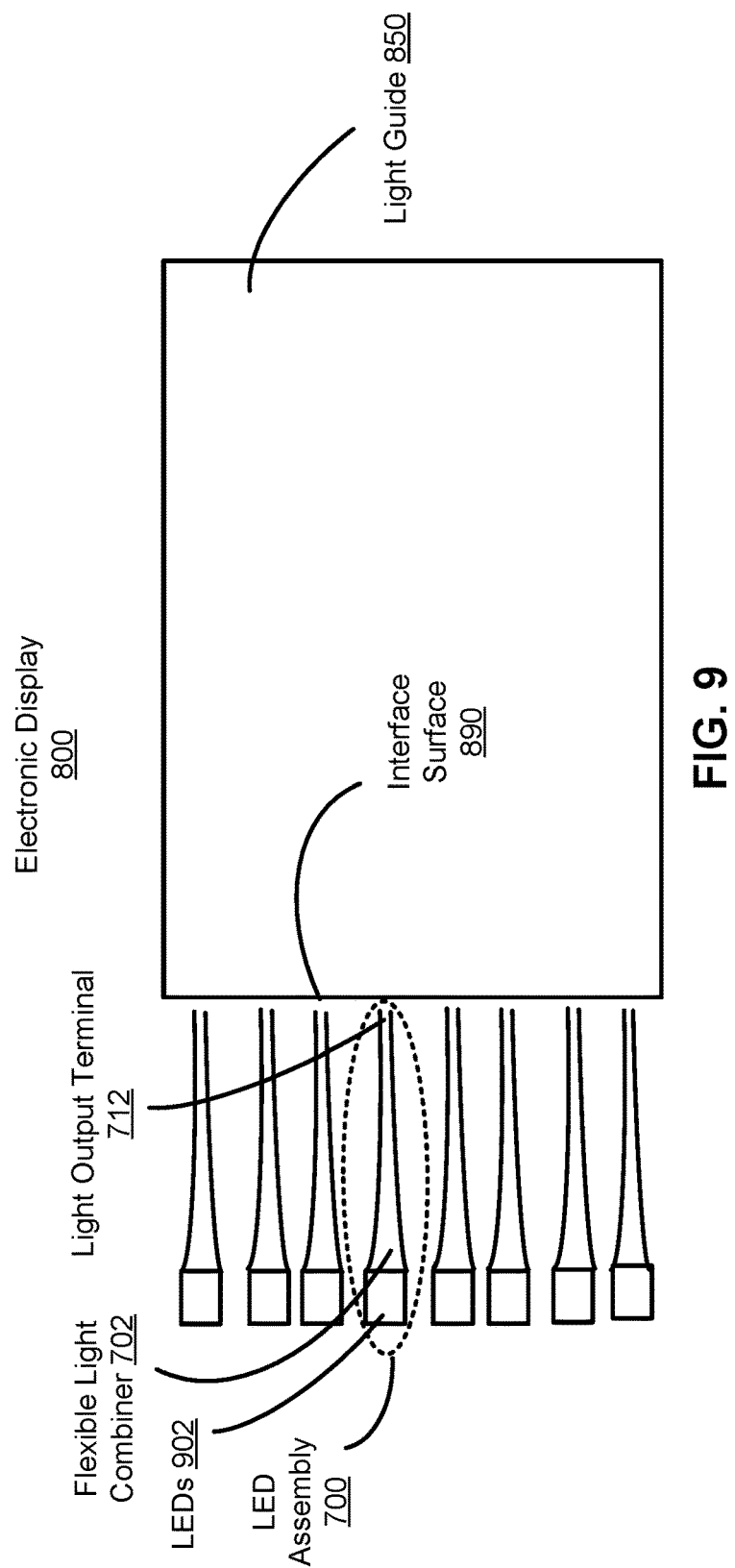
FIG. 9 shows a front view of a backlight of an electronic display, in accordance with some embodiments.

FIG. 9 shows a front view of the backlight 802 of the electronic display 800 taken along the line B shown in FIG. 8. The light output terminals 712 of multiple LED assemblies 700 are arranged adjacently along an edge of the electronic display 800 and the light guide 850 to provide light to the interface surface 890 of the light guide 850. In FIG. 9, the light output terminals 712 of the LED assemblies 700 are arranged along the left edge of the light guide 850. In various embodiments, light output terminals 712 of multiple LED assemblies 700 may be arranged along one or more edges of the light guide 850, such as the left, right, top, and/or bottom edges.

For each LED assembly 700, the flexible light combiner 702 allows the colored LEDs 902 to be placed away from the edges of the light guide 850 while preserving edge-lighting functionality. The light output terminals 712 are optically coupled with the light guide 850, and thus the LEDs 902 can be placed further from the light guide 850. In comparison, the LEDs 902 must be placed at an edge adjacent to the light guide 850 if a direct coupling is used between the light guide 850 and the color LEDs 902.

Figure 10:
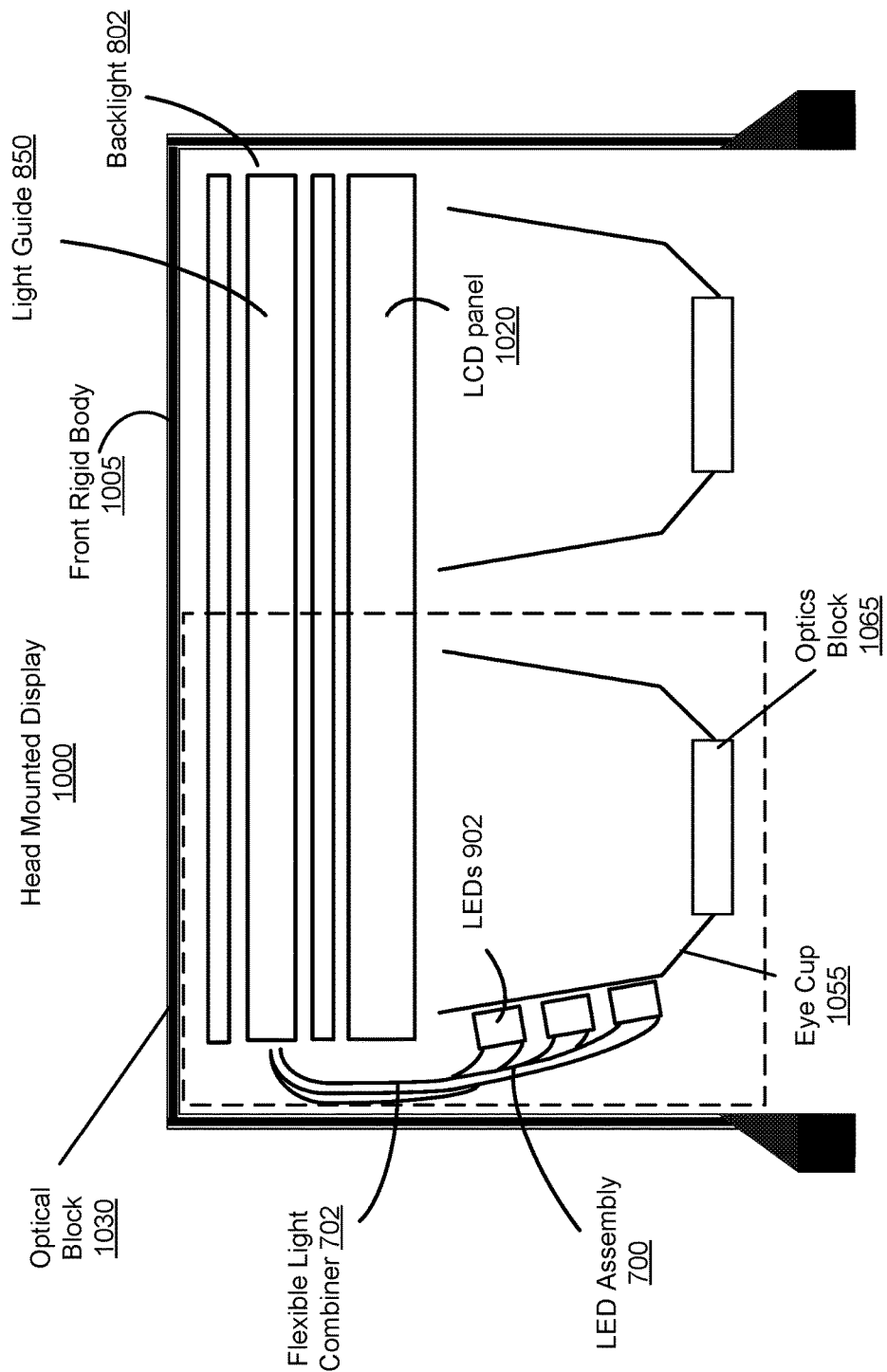
FIG. 10 shows a HMD including a flexible light combiner, in accordance with some embodiments.

FIG. 10 shows a HMD 1000 including a flexible light combiner, in accordance with some embodiments. The HMD 1000 includes front rigid body 1005 including an optical block 1030. The optical block 1030 includes LCD panel 1020, a backlight 802 including LED assembly 700, an eye cup 1055, and an optics block 1065. The LED assembly 700 includes flexible light combiner 702, as discussed above. The backlight 802 is disposed behind the LCD panel 1020, and the eye cup 1055 is disposed in front of the LCD panel 1020.

In some embodiments, the LEDs 902 coupled with the flexible light combiners 702 are arranged along the eye cup 1055. At least a portion of the flexible light combiner 702 may be wrapped around the eye cup 1055 to support the placement of the LEDs 902 along a surface of the eye cup 1055. In another example, at least a portion of the flexible light combiner 702 is wrapped around a side surface of the light guide 850.

In some embodiments, the right side of the HMD 1000 may also include a second optical block. The second optical block may include, among other things, an eye cup. LED assemblies 700 may also be included within the other optical block. In some embodiments, the light output regions of the LED assemblies 700 are positioned along a single edge of the LCD panel 1020, such as the left edge as shown in FIG. 10. In another example, the light output regions of the LED assemblies 700 are positioned along the left and right edge. In another example, the light output regions of the LED assemblies are positioned along the top and/or bottom edge. The LEDs may be disposed along the surfaces of the left and right eye cups of the HMD 1000.

In some embodiments, a single LED provides light input to two or more light channels. The light channels sharing a single LED may belong to different flexible light combiners, or the same flexible light combiner. FIG. 11A shows a first color LED 1106 optically coupled with multiple light channels. The first color LED 1106 is optically coupled with a light channel 1124 of a flexible light combiner 1102 at the first light input terminal 1108, and also optically coupled with a light channel 1126 of a flexible light combiner 1104 at the first light input terminal 1110. A higher power or high efficiency color LED may be used to drive multiple flexible light combiners. For example, if a red color LED is higher power than the green and blue color LEDs, then a single red LED may be optically coupled with two or more flexible light combiners. The first color LED 1106 is a red color LED, while the second color LEDs 1112 are green LEDs, and the third color LEDs 1114 are blue LEDs. In some embodiments, a single green LED and/or blue LED may drive multiple flexible light combiners. In various embodiments, two or more flexible light combiners may share a single LED.

Figure 11B:
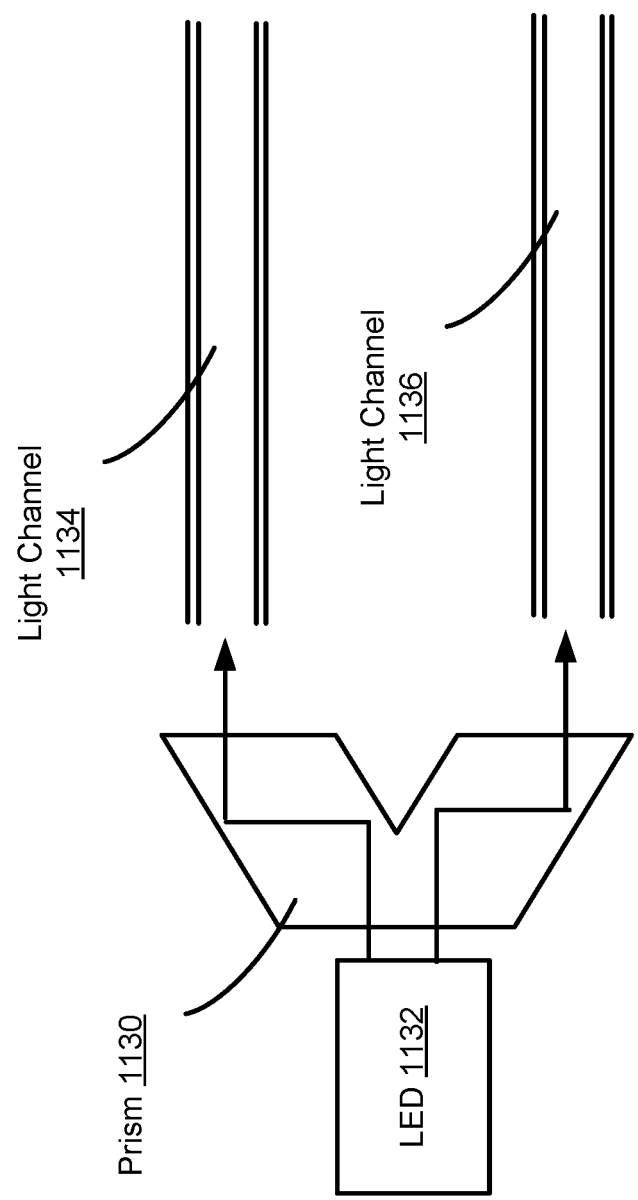
FIG. 11B shows a prism that optically couples an LED with multiple light channels, in accordance with some embodiments.

An LED may optically couple with two or more light channels using various techniques. FIG. 11B shows a prism 1130 that optically couples an LED 1132 with multiple light channels. The prism 1130 spatially separates portions of light emitted from the LED 1332 to provide the light to the light channel 1134 and light channel 1136. The light channel 1134 and 1136 may belong to separate flexible light combiners, or may be light channels of a single flexible light combiner.

Figure 11C:
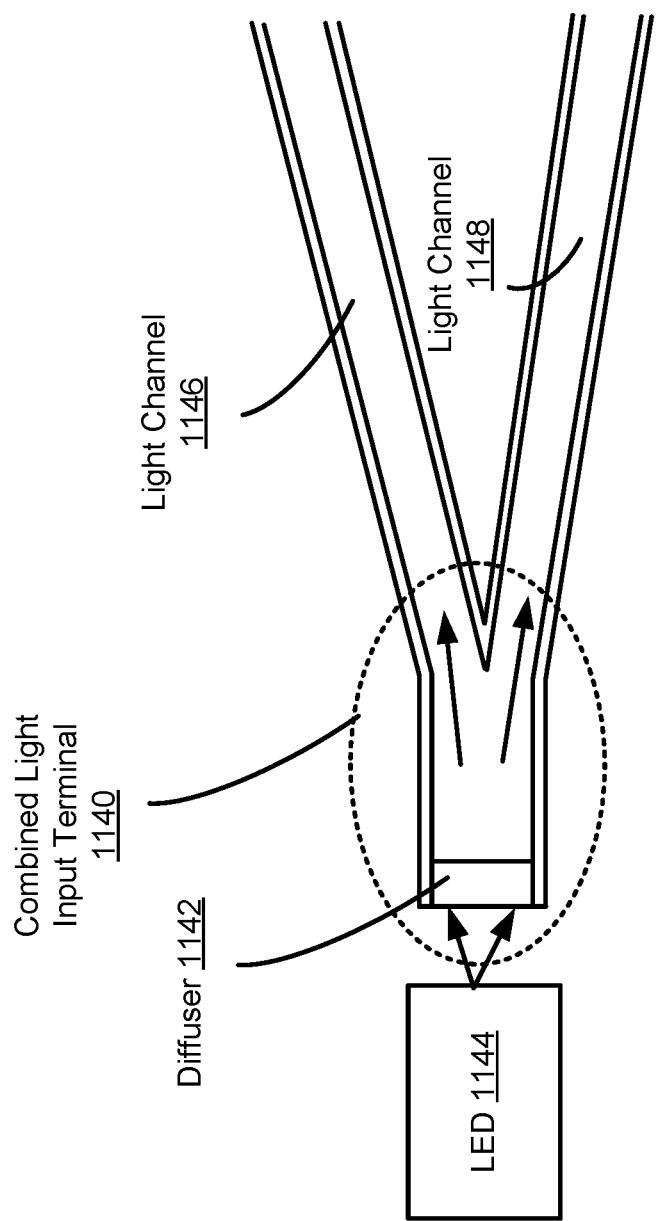
FIG. 11C shows a combined light input terminal that optically couples an LED with multiple light channels, in accordance with some embodiments.

FIG. 11C shows a combined light input terminal 1140 that optically couples an LED 1144 with multiple light channels. The combined light input terminal splits into separate light channels 1146 and 1148. The light channels 1146 and 1148 may be part of a single flexible light combiner, or may be part of two separate flexible light combiners. The combined light input terminal 1140 may include a diffuser 1142 to scatter light emitted from the LED 1144 to facilitate the propagation of light through each of the light channels 1146 and 1148.

Flexible Light Combiners for Hotspot Reduction

In some embodiments, a flexible light combiner reduces the occurrence of hotspots for a backlight. A hotspot can be caused by a large distances between adjacent light sources of the same color, which results in an uneven distribution of light from the backlight on the pixels of the LCD panel. With reference to FIG. 9, more LEDs 902 may be optically coupled with the interface surface 890 via flexible light combiners 702 than if the LEDs 902 were disposed at the interface surface 890 and directly coupled with the light guide 850. The flexible light combiners 702 may be tapered to reduce the physical dimensions of the flexible light combiner 702 at the light output terminal 712 (e.g., relative to the light input regions including coupled LEDs 902 at the other end of the flexible light combiner 702), and thus a greater density of LEDs 902 can be coupled at the interface surface 890. The distance between adjacent light output terminals 712 is not directly constrained by the physical dimensions of the LEDs 902. The distance between light emissions of the same color can be reduced by using flexible light combiners, and thus the occurrence of hotspots also can be reduced. In some embodiments, RGB LEDs are optically coupled with flexible light combiners instead of color LEDs.

With reference to FIG. 9, the light output terminals 712 of the LED assemblies 700 are arranged in an evenly spaced array at an edge of the LCD panel. In some embodiments, the light output terminals 712 may be arranged into multiple offset arrays to reduce the distance between light sources.

Figure 12:
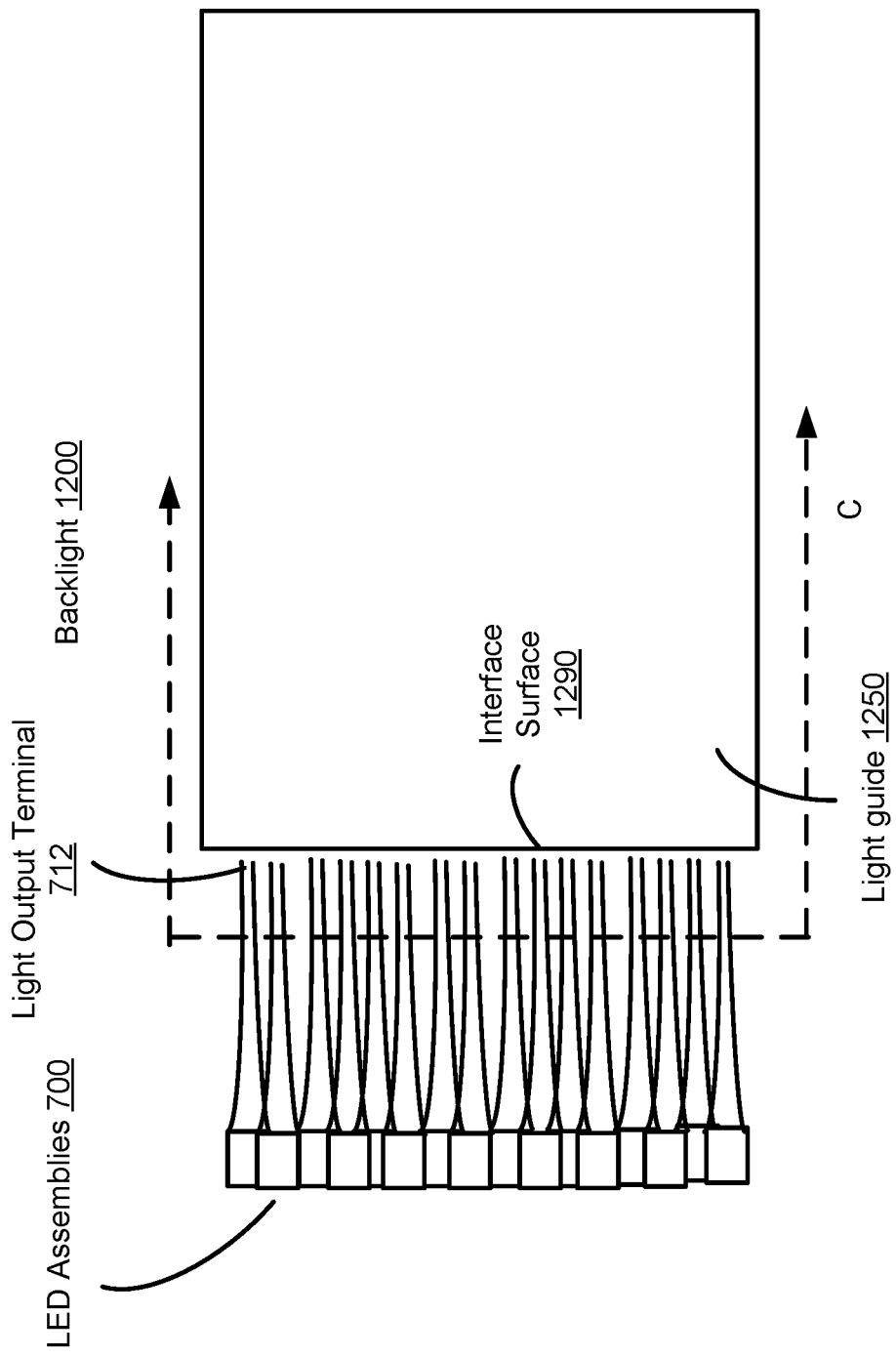
FIG. 12 shows a front view of a backlight including LED assemblies arranged as offset arrays, in accordance with some embodiments.
Figure 13:
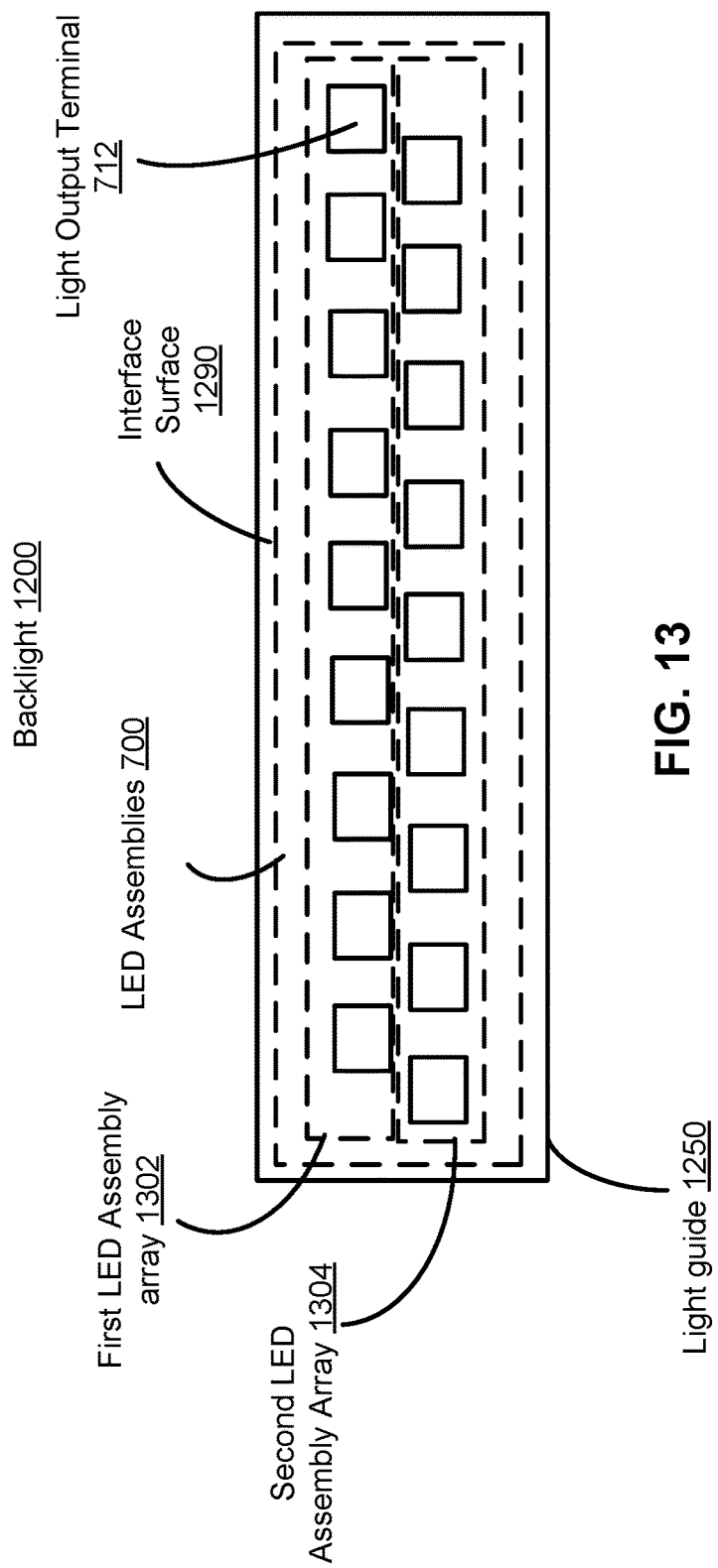
FIG. 13 shows a cross sectional side view of the backlight including LED assemblies arranged as offset arrays, in accordance with some embodiments.

FIG. 12 shows a front view of a backlight 1200 including LED assemblies 700 arranged as offset arrays. In particular, the light output terminals 712 of multiple LED assemblies 700 are arranged into two or more offset arrays along an edge of the light guide 1250 to provide light to the interface surface 1290 with reduced occurrence of hot spots. FIG. 13 shows a cross sectional side view of the backlight 1200 shown in FIG. 12 taken along the line C. With reference to FIG. 13, the LED assemblies 700 include a first array of LED assemblies 1302 and a second array of LED assemblies 1304. The boxes represent the locations of light output terminals of the LED assemblies 700. The light output terminals of the first array of LEDs assemblies 1302 are offset relative to the light output terminals of the second array of LED assemblies 1304. For example, the first and second arrays of LED assemblies 1302 and 1304 are arranged such that the center of the light output terminals of the first array of LED assemblies 1302 align with the space between adjacent light output terminals of the second array of LED assemblies 1304. The distance between adjacent light output terminals of LED assemblies is effectively reduced, and thus the occurrence of hotspots is also reduced.

Control of LED Assemblies

FIG. 14 shows a flow chart of a process 1400 for controlling an LED assembly of a backlight, in accordance with some embodiments. Process 1400 can be performed by, for example, the controller 440 of an electronic display 155. In other embodiments, some or all of the steps may be performed by other entities. In addition, some embodiments may perform the steps in parallel, perform the steps in different orders, or perform different steps. In some embodiments, process 1400 may be performed to provide a strobed backlight where light sources are flashed on and off over time to provide illumination to a LCD panel.

At 1410, the controller 440 is configured to determine a first emission spectrum of a first color LED of an LED assembly and a second emission spectrum of a second color LED of the LED assembly. The backlight may be a strobed backlight to reduce motion blur, where the color LEDs are switched on and off over time.

The LED assembly includes two or more different color LEDs optically coupled with a flexible light combiner. In some embodiments, the LEDs include different color LEDs, such as a red, green, and blue LED. As discussed above, different color LEDs may include different emission spectrums, where spectrum intensity varies as a function of wavelength as shown in FIG. 6B.

At 1420, the controller 440 is configured determine a first emission response time of the first color LED and a second emission response time of the second color LED. Emission response time refers to a delay between an input current and light emission output for an LED. Different color LEDs may include different emission response times.

At 1430, the controller 440 is configured to control the first emission spectrum of the first color LED relative to the second emission spectrum of the second color LED. The controller 440 may be configured to optimize an emission spectrum of combined light for the backlight based on separately controlling the emission spectrums of the color LEDs. The controller generates separate intensity control signals for each type of color LED. For example, the current input into a lower efficiency color LED may be higher than the current input into a higher efficiency color LED, where a higher current increases the intensity of the emission spectrum. Thus the quality of the combined light output from the backlight is improved in terms of color gamut and/or brightness. In some embodiments, the emission spectrum of color LEDs is optimized such that differently colored light sources emit light with similar intensity at corresponding wavelengths, as shown by the spectrum plots 660A, 660B, and 660C in FIG. 6.

In some embodiments, the optimization further considers the effect of flexible light combiners on the emission spectrums of the LEDs. For example, light propagated through a flexible light combiner may include attenuation by wavelength, loss due to light channel bends, manufacturing defects, etc.

At 1440, the controller 440 is configured to control the first emission response time of the first color LED relative to the second emission response time of the second LED. The controller 440 may balance the emission response times of the color LEDs based on separately controlling input signals to the color LEDs. The separate light intensity control signals for each type of color LED may include timing offsets to balance different emission response times. For example, an input current to a color LED with a longer emission response time may be provided at an earlier such that the timing of light emission output from the color LED matches the timing of light emission output from a second color LED having a shorter emission response time. Similarly, an input current to a color LED with a shorter emission response time may be provided at a later time such that the timing of light emission output from the color LED matches the timing of light emission output from a second color LED having a longer emission response time. In some embodiments, the controller 440 balances the emission response time for each of the color LEDs of an LED assembly.

In that sense, intensity control signals output from the controller 440 compensates for emission spectrum and emission response time differences between different color LEDs, resulting in a backlight with improved color gamut and brightness.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A liquid crystal display (LCD) device, comprising:
an LCD panel; and
a backlight for illuminating the LCD panel, the backlight including:
an LED assembly, including:
a first color LED emitting a first light at a first wavelength;
a second color LED emitting a second light at a second wavelength; and
a flexible light combiner, the flexible light combiner including a flexible core including: a first light channel to transmit first light generated by the first color LED, a first end of the first light channel optically coupled with the first color LED; a second light channel to transmit second light generated by the second color LED, a first end of the second light channel optically coupled with the second color LED; and a light output terminal defined by second ends of the first and second light channels to output the first light and the second light, respectively, in a first direction, the light output terminal disposed behind the LCD panel along an edge of the LCD panel; and
a light guide configured to:
combine the first light and second light received from the light output terminal of the flexible light combiner into combined light; and
direct the combined light to the pixels of the LCD panel in a second direction to illuminate the LCD panel;
wherein:
the first color LED includes a first emission response time and the second color LED includes a second emission response time different from the first emission response time; and
the display device further includes a controller configured to adjust for the first emission response time being different from the second emission response time based on providing a first control signal to drive the first color LED and a second control signal to drive the second color LED, the first control signal including a timing offset relative to the second control signal.

2. The LCD device of claim 1, wherein the flexible light combiner includes a flexible cladding surrounding the flexible core.

3. The LCD device of claim 1, further comprising a plurality of LED assemblies, each of the LED assemblies including a light output terminal disposed behind the LCD panel along one or more edges of the LCD panel.

4. The LCD device of claim 1, wherein the first light channel includes a fiber optic cable.

5. The LCD device of claim 4, wherein the fiber optic cable is tapered such that the first end of the first light channel is thicker than the second end of the first light channel.

6. The LCD device of claim 1, wherein the first light channel homogenizes the first light and the second light channel homogenizes the second light.

7. The LCD device of claim 1, wherein:
the LED assembly includes a third color LED emitting third light at a third wavelength;
the flexible core of the flexible light combiner includes a third light channel to transmit the third light from the third color LED, a first end of the third light channel optically coupled with the third color LED;
the light output terminal is defined by a second end of the third light channel to output the third light in the first direction; and
the light guide is configured to combine the third light with the first light and the second light received from the light output terminal into the combined light to illuminate the LCD panel.

8. The LCD device of claim 7, wherein the first color LED is a red LED, the second color LED is a green LED, and the third color LED is a blue LED.

9. A liquid crystal display (LCD) device, comprising:
an LCD panel; and
a backlight for illuminating the LCD panel, the backlight including:
an LED assembly, including:
a first color LED emitting a first light at a first wavelength;
a second color LED emitting a second light at a second wavelength; and
a flexible light combiner, the flexible light combiner including a flexible core including: a first light channel to transmit first light generated by the first color LED, a first end of the first light channel optically coupled with the first color LED; a second light channel to transmit second light generated by the second color LED, a first end of the second light channel optically coupled with the second color LED; and a light output terminal defined by second ends of the first and second light channels to output the first light and the second light, respectively, in a first direction, the light output terminal disposed behind the LCD panel along an edge of the LCD panel; and
a light guide configured to:
combine the first light and second light received from the light output terminal of the flexible light combiner into combined light; and
direct the combined light to the pixels of the LCD panel in a second direction to illuminate the LCD panel;
wherein:
the backlight further includes a second LED assembly including a second flexible light combiner; and
at least one of the first or second color LED is connected with the a light channel of the second LED assembly.

10. A liquid crystal display (LCD) device, comprising:
an LCD panel; and
a backlight for illuminating the LCD panel, the backlight including:
an LED assembly, including:
a first color LED emitting a first light at a first wavelength;
a second color LED emitting a second light at a second wavelength; and
a flexible light combiner, the flexible light combiner including a flexible core including: a first light channel to transmit first light generated by the first color LED, a first end of the first light channel optically coupled with the first color LED; a second light channel to transmit second light generated by the second color LED, a first end of the second light channel optically coupled with the second color LED; and a light output terminal defined by second ends of the first and second light channels to output the first light and the second light, respectively, in a first direction, the light output terminal disposed behind the LCD panel along an edge of the LCD panel; and
a light guide configured to:
combine the first light and second light received from the light output terminal of the flexible light combiner into combined light; and
direct the combined light to the pixels of the LCD panel in a second direction to illuminate the LCD panel;
wherein:
the light guide is disposed behind the LCD panel;
the LCD device further includes an eye cup disposed in front of the LCD panel; and
at least a portion of the flexible light combiner is wrapped around the eye cup such that the first and second LEDs are disposed along a surface of the eye cup.

11. A liquid crystal display (LCD) device, comprising:
an LCD panel; and
a backlight for illuminating the LCD panel, the backlight including:
an LED assembly, including:
a first color LED emitting a first light at a first wavelength;
a second color LED emitting a second light at a second wavelength; and
a flexible light combiner, the flexible light combiner including a flexible core including: a first light channel to transmit first light generated by the first color LED, a first end of the first light channel optically coupled with the first color LED; a second light channel to transmit second light generated by the second color LED, a first end of the second light channel optically coupled with the second color LED; and a light output terminal defined by second ends of the first and second light channels to output the first light and the second light, respectively, in a first direction, the light output terminal disposed behind the LCD panel along an edge of the LCD panel; and
a light guide configured to:
combine the first light and second light received from the light output terminal of the flexible light combiner into combined light; and
direct the combined light to the pixels of the LCD panel in a second direction to illuminate the LCD panel;

wherein:
the first color LED has a lower efficiency than the second color LED; and
the display device further includes a controller configured to adjust for the first color LED having the lower efficiency than the second color LED based on providing a first control signal to drive the first color LED and a second control signal to the drive the second color LED, the first control signal including a higher current than the second control signal.

12. The display device of claim 1, wherein the first and second color LEDs are disposed away from the light guide.

13. A head-mounted display (HMD), comprising:
a liquid crystal display (LCD) device, including:
an LCD panel; and
a backlight for illuminating the LCD panel, the backlight including:
an LED assembly, including:
a first color LED emitting a first light at a first wavelength;
a second color LED emitting a second light at a second wavelength; and
a flexible light combiner, the flexible light combiner including a flexible core including: a first light channel to transmit red light generated by the first color LED, a first end of the first light channel optically coupled with the first color LED; a second light channel to transmit second light generated by the second color LED, a first end of the second light channel optically coupled with the second color LED; and a light output terminal defined by second ends of the first and second light channels to output the first light and the second light in a first direction, the light output terminal disposed behind the LCD panel along an edge of the LCD panel; and
a light guide configured to:
combine the first light and second light received from the light output terminal of the flexible light combiner into combined light; and
direct the combined light to the pixels of the LCD panel in a second direction to illuminate the LCD panel;
wherein:
the first color LED includes a first emission response time and the second color LED includes a second emission response time different from the first emission response time; and
the display device further includes a controller configured to adjust for the first emission response time being different from the second emission response time based on providing a first control signal to drive the first color LED and a second control signal to drive the second color LED, the first control signal including a timing offset relative to the second control signal.

14. The HMD of claim 13, wherein the flexible light combiner includes a flexible cladding surrounding the flexible core.

15. The HMD of claim 13, further comprising a plurality of LED assemblies, each of the LED assemblies including a light output terminal disposed behind the LCD panel along one or more edges of the LCD panel.

16. The HMD of claim 13, wherein the first light channel includes a fiber optic cable.

17. The HMD of claim 16, wherein the fiber optic cable is tapered such that the first end of the first light channel is thicker than the second end of the first light channel.

18. The HMD of claim 13, wherein the first light channel homogenizes the first light and the second light channel homogenizes the second light.

19. The HMD of claim 13, wherein:
the LED assembly includes a third color LED emitting third light at a third wavelength;
the flexible core of the flexible light combiner includes a third light channel to transmit the third light from the third color LED, a first end of the third light channel optically coupled with the third color LED;
the light output terminal is defined by a second end of the third light channel to output the third light in the first direction; and
the light guide is configured to combine the third light with the first light and the second light received from the light output terminal into the combined light to illuminate the LCD panel.

20. The HMD of claim 19, wherein the first color LED is a red LED, the second color LED is a green LED, and the third color LED is a blue LED.

21. A head-mounted display (HMD), comprising:
a liquid crystal display (LCD) device, including:
an LCD panel; and
a backlight for illuminating the LCD panel, the backlight including:
an LED assembly, including:
a first color LED emitting a first light at a first wavelength;
a second color LED emitting a second light at a second wavelength; and
a flexible light combiner, the flexible light combiner including a flexible core including: a first light channel to transmit red light generated by the first color LED, a first end of the first light channel optically coupled with the first color LED; a second light channel to transmit second light generated by the second color LED, a first end of the second light channel optically coupled with the second color LED; and a light output terminal defined by second ends of the first and second light channels to output the first light and the second light in a first direction, the light output terminal disposed behind the LCD panel along an edge of the LCD panel; and
a light guide configured to:
combine the first light and second light received from the light output terminal of the flexible light combiner into combined light; and
direct the combined light to the pixels of the LCD panel in a second direction to illuminate the LCD panel;
wherein:
the backlight further includes a second LED assembly including a second flexible light combiner; and
at least one of the first or second color LED is connected with the a light channel of the second LED assembly.

22. A head-mounted display (HMD), comprising:
a liquid crystal display (LCD) device, including:
an LCD panel; and
a backlight for illuminating the LCD panel, the backlight including:

an LED assembly, including:
  a first color LED emitting a first light at a first wavelength;
  a second color LED emitting a second light at a second wavelength; and
  a flexible light combiner, the flexible light combiner including a flexible core including: a first light channel to transmit red light generated by the first color LED, a first end of the first light channel optically coupled with the first color LED; a second light channel to transmit second light generated by the second color LED, a first end of the second light channel optically coupled with the second color LED; and a light output terminal defined by second ends of the first and second light channels to output the first light and the second light in a first direction, the light output terminal disposed behind the LCD panel along an edge of the LCD panel; and
  a light guide configured to:
    combine the first light and second light received from the light output terminal of the flexible light combiner into combined light; and
    direct the combined light to the pixels of the LCD panel in a second direction to illuminate the LCD panel;
  wherein:
    the light guide is disposed behind the LCD panel;
    the LCD device further includes an eye cup disposed in front of the LCD panel; and
    at least a portion of the flexible light combiner is wrapped around the eye cup such that the first and second LEDs are disposed along a surface of the eye cup.

23. A head-mounted display (HMD), comprising:
a liquid crystal display (LCD) device, including:
  an LCD panel; and
  a backlight for illuminating the LCD panel, the backlight including:
    an LED assembly, including:
      a first color LED emitting a first light at a first wavelength;
      a second color LED emitting a second light at a second wavelength; and
      a flexible light combiner, the flexible light combiner including a flexible core including: a first light channel to transmit red light generated by the first color LED, a first end of the first light channel optically coupled with the first color LED; a second light channel to transmit second light generated by the second color LED, a first end of the second light channel optically coupled with the second color LED; and a light output terminal defined by second ends of the first and second light channels to output the first light and the second light in a first direction, the light output terminal disposed behind the LCD panel along an edge of the LCD panel; and
    a light guide configured to:
      combine the first light and second light received from the light output terminal of the flexible light combiner into combined light; and
      direct the combined light to the pixels of the LCD panel in a second direction to illuminate the LCD panel;
  wherein:
    the first color LED has a lower efficiency than the second color LED; and
    the display device further includes a controller configured to adjust for the first color LED having the lower efficiency than the second color LED based on providing a first control signal to drive the first color LED and a second control signal to the drive the second color LED, the first control signal including a higher current than the second control signal.

* * * * *

UNITED STATES PATENT AND TRADEMARK OFFICE
CERTIFICATE OF CORRECTION

PATENT NO.         : 10,107,950 B2
APPLICATION NO.    : 15/370664
DATED              : October 23, 2018
INVENTOR(S)        : Shie Ping Jeffrey Tseng et al.

Page 1 of 1

It is certified that error appears in the above-identified patent and that said Letters Patent is hereby corrected as shown below:

In the Claims

Column 18, Lines 39 and 40, Claim 11, delete "signal to the drive the second color LED" and insert -- signal to drive the second color LED --.

Column 21, Lines 40 and 41, Claim 23, delete "signal to the drive the second color LED" and insert -- signal to drive the second color LED --.

Signed and Sealed this
Sixteenth Day of April, 2019

Andrei Iancu
*Director of the United States Patent and Trademark Office*